(12) United States Patent
Saito et al.

(10) Patent No.: US 8,378,063 B2
(45) Date of Patent: Feb. 19, 2013

(54) PROCESS FOR PRODUCING FLUOROPOLYMER PARTICLES

(75) Inventors: Susumu Saito, Chiyoda-ku (JP); Tetsuji Shimohira, Chiyoda-ku (JP); Takashi Saeki, Chiyoda-ku (JP); Junichi Tayanagi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 176 days.

(21) Appl. No.: 12/644,306

(22) Filed: Dec. 22, 2009

(65) Prior Publication Data

US 2010/0160598 A1    Jun. 24, 2010

Related U.S. Application Data

(60) Provisional application No. 61/174,541, filed on May 1, 2009.

(30) Foreign Application Priority Data

Dec. 22, 2008 (JP) ................................. 2008-325358

(51) Int. Cl.
*C08F 6/00* (2006.01)

(52) U.S. Cl. .................... 528/480; 528/502 R; 528/503; 526/206; 526/242; 526/247; 526/250; 526/252; 526/253; 526/254; 526/255; 521/27; 521/44.5

(58) Field of Classification Search .................... 526/72, 526/79, 201, 206, 242, 247, 249, 250, 252, 526/253, 254, 255; 528/480, 481, 502 R, 528/502 A, 502 C, 502 D, 502 E, 502 F, 503; 521/27, 40, 44.5
See application file for complete search history.

(56) References Cited

FOREIGN PATENT DOCUMENTS

| JP | 11-35638 | 2/1999 |
| JP | 3791137 | 4/2006 |
| JP | 2006-160823 | 6/2006 |
| JP | 4144463 | 6/2008 |

OTHER PUBLICATIONS

Machine translation of JP 11-035626.*
Office translation of JP 11-035626 (Watakabe et al).*
International Search Report issued Mar. 23, 2010 in PCT/JP2009/070922.

* cited by examiner

*Primary Examiner* — Frances Tischler
(74) *Attorney, Agent, or Firm* — Oblon, Spivak, McClelland, Maier & Neustadt, L.L.P.

(57) ABSTRACT

A process for producing fluoropolymer particles includes preparing a solution/dispersion containing fluoropolymer dissolved/dispersed in a first solvent such that the swelling of fluoropolymer by the first solvent is from 50 to 1,200%, and mixing the solution/dispersion with a second solvent such that fluoropolymer forms particles and the swelling of fluoropolymer by the mixture of the first and second solvents is from 0 to 100%. $W_C/W_B$ is in the range of from 1 to 5, $W_B$ represents mass of the first solvent, $W_C$ represents mass of the second solvent, $W_C/W_B$ represents a ratio of the mass of the second solvent to the mass of the first solvent. $S_{BC}/S_B$ is at most 0.5. $S_{BC}$ represents the swelling by the mixture of the first and second solvents, $S_B$ represents the swelling by the first solvent, and $S_{BC}/S_B$ represents a ratio of the swelling by the mixture to the swelling by the first solvent.

17 Claims, No Drawings

PROCESS FOR PRODUCING FLUOROPOLYMER PARTICLES

BACKGROUND OF THE INVENTION

1. Field of the Invention

The present invention relates to a process for producing fluoropolymer particles.

2. Discussion of Background

A fluoropolymer has various excellent properties and is thus used in a wide range of applications. For example, a perfluorocarbon polymer having a sulfonic acid type functional group is used for e.g. diaphragms (for alkali electrolysis, electrodialysis, various organic electrolytic syntheses, etc.), polymer electrolyte membranes (for fuel cells, ozone-generating electrolysis, water electrolysis, etc.), polymer catalysts (for organic syntheses, polymerization, etc.) and other membrane materials (for dehumidifiers, humidifying devices, etc.).

In the past, a perfluorocarbon polymer having a sulfonic acid type functional group was produced by a solution polymerization method in a chlorofluorocarbon (such as trichlorotrifluoroethane). Further, also when such a polymer is flocculated from the solution obtained by the solution polymerization method to obtain polymer particles, a chlorofluorocarbon (such as trichlorofluoromethane) was used as a solvent for the flocculation.

However, in recent years, use of a chlorofluorocarbon has been restricted, and a shift to the following substitute solvents has been proposed.

(1) A method for producing a perfluorocarbon polymer having a sulfonic acid type functional group, wherein a specific hydrochlorofluorocarbon, hydrofluorocarbon or fluorocarbon is used as a solvent to be used for the solution polymerization, and a hydrofluoroether compound is used as a solvent for the flocculation (Patent Document 1).

(2) A method for producing fluoropolymer particles, wherein a specific hydrofluoroalkyl ether is used as a solvent for the polymerization, and water is used as a solvent for the flocculation (Patent Document 2).

However, in a case where by the method (1), a hydrofluoroether compound is employed to flocculate the polymer thereby to obtain polymer particles, fine particles will be formed in a large amount, whereby separation of the polymer particles by filtration and recovery of an unreacted monomer tend to be difficult.

Further, also by the method (2), fine particles will be formed in a large amount, separation of such polymer particles by filtration and recovery of an unreacted monomer tend to be difficult.

Patent Document 1: Japanese Patent No. 3,791,137
Patent Document 2: Japanese Patent No. 4,144,463

SUMMARY OF THE INVENTION

It is an object of the present invention to provide a process for producing fluoropolymer particles, whereby formation of fine particles is sufficiently suppressed.

The present invention provides a process for producing fluoropolymer particles, which comprises the following steps (i) and (ii):

(i) a step of preparing a solution or dispersion of a fluoropolymer (A) having the fluoropolymer (A) dissolved or dispersed in a solvent (B), wherein the following conditions (i-1) and (i-2) are satisfied:

(i-1) the solvent (B) contains a good solvent (B2) whereby the degree of swelling of the fluoropolymer (A) exceeds 50%, and (i-2) the degree of swelling of the fluoropolymer (A) by the solvent (B) is from 50 to 1,200%; and (ii) a step of mixing the solution or dispersion of a fluoropolymer (A) with a solvent (C) to flocculate the fluoropolymer (A) thereby to form particles of the fluoropolymer (A), wherein the following conditions (ii-1) to (ii-4) are satisfied:

(ii-1) the solvent (C) contains a poor solvent (C1) whereby the degree of swelling of the fluoropolymer (A) is at most 50%, (ii-2) the degree of swelling of the fluoropolymer (A) by a mixed solvent (BC) of the solvents (B) and (C) is from 0 to 100%, (ii-3) the ratio ($W_C/W_B$) of the mass ($W_C$) of the solvent (C) to the mass ($W_B$) of the solvent (B) is from 1 to 5, and (ii-4) the ratio ($S_{BC}/S_B$) of the degree of swelling ($S_{BC}$) of the fluoropolymer (A) by the mixed solvent (BC) to the degree of swelling ($S_B$) of the fluoropolymer (A) by the solvent (B) is at most 0.5.

The solvent (B) preferably further contains a poor solvent (B1) whereby the degree of swelling of the fluoropolymer (A) is at most 50%.

The above poor solvent (B1) is preferably at least one member selected from a hydrofluoroether (hereinafter referred to as HFE) and a hydrofluorocarbon (hereinafter referred to as HFC).

HFE is preferably $CF_3CH_2OCF_2CF_2H$.
HFC is preferably $CF_3CH_2CF_2CH_3$ or $CHF_2CH_2CF_3$.

The degree of swelling of the fluoropolymer (A) by the solvent (B) is preferably from 100 to 800%.

The degree of swelling of the fluoropolymer (A) by the solvent (BC) is preferably from 0 to 90%.

The above good solvent (B2) is preferably HFC.
HFC is preferably $C_6F_{13}H$.

The poor solvent (C1) is preferably at least one member selected from HFE and HFC.

HFE is preferably $CF_3CH_2OCF_2CF_2H$.
HFC is preferably $CF_3CH_2CF_2CH_3$ or $CHF_2CH_2CF_3$.

The fluoropolymer (A) is preferably a perfluorocarbon polymer having a sulfonic acid type functional group.

In the above step (ii), the temperature of the solution or dispersion of the fluoropolymer (A) immediately before mixing the solution or dispersion of the fluoropolymer (A) with the solvent (C) is preferably within a range of from 35 to 60° C.

The fluoropolymer particles preferably have a proportion of particles of at most 38 μm being at most 5 mass %.

Effects of the Invention

According to the process for producing fluoropolymer particles of the present invention, formation of fine particles can be sufficiently suppressed, and separation and recovery of the fluoropolymer particles by filtration, and recovery of an unreacted monomer, can be facilitated.

Further, since formation of fine particles can be sufficiently suppressed, at the time of carrying out solid-liquid separation by centrifugal separation or decantation, sedimentation can be facilitated, and separation of the polymer becomes easier, and at the time of storage, its handling will be easy, and safety will be improved against a risk of aspiration of the polymer powder.

DETAILED DESCRIPTION OF THE PREFERRED EMBODIMENTS

In this specification, a compound represented by the formula (m1) will be referred to as a compound (m1). The same applies to compounds represented by other formulae.

Further, a hydrofluoroether (HFE) is a compound composed solely of hydrogen, fluorine, oxygen and carbon, and a hydrofluorocarbon (HFC) is a compound composed solely of hydrogen, fluorine and carbon.

Process for Producing Fluoropolymer Particles

The process for producing fluoropolymer particles of the present invention comprises the following steps (i) to (iii).

(i) A step of preparing a solution or dispersion of a fluoropolymer (A) having the fluoropolymer (A) dissolved or dispersed in a solvent (B).

(ii) A step of mixing the solution or dispersion of a fluoropolymer (A) with a solvent (C) to flocculate the fluoropolymer (A) thereby to from particles of the fluoropolymer (A).

(iii) As the case requires, a step of separating and recovering the particles of the fluoropolymer (A) by filtration.

Step (i)

In the step (i), the following conditions (i-1) and (i-2) are required to be satisfied.

(i-1) The solvent (B) contains a good solvent (B2) whereby the degree of swelling of the fluoropolymer (A) exceeds 50%.

(i-2) The degree of swelling of the fluoropolymer (A) by the solvent (B) is from 50 to 1,200%.

Condition (i-1):

If the solvent (B) does not contain a good solvent (B2), it becomes difficult to satisfy the after-mentioned condition (i-2).

In a case where the fluoropolymer (A) is a perfluorocarbon polymer having a sulfonic acid type functional group, the good solvent (B2) may, for example, be $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$ or $(CF_3)_2CFCFHCFHCF_3$, and from the viewpoint of the availability, cost, boiling point and separation and recovery, $C_6F_{13}H$ is preferred. As the good solvent (B2), one type may be used alone, or two or more types may be used in combination.

The solvent (B) preferably contains a poor solvent (B1) whereby the degree of swelling of the fluoropolymer (A) is at most 50%, within a range to satisfy the after-mentioned condition (i-2). When the solvent (B) contains the poor solvent (B1), in the step (ii), the fluoropolymer (A) tends to readily flocculate thereby to readily form particles of the fluoropolymer (A) having a proper particle size.

In a case where the fluoropolymer (A) is a perfluorocarbon polymer having a sulfonic acid type functional group, the poor solvent (B1) may, for example, be HFE, HFC, methanol, ethanol, 1-propanol, isopropanol, n-butanol, 2-butanol, t-butanol, acetone, acetonitrile, 1,2-dimethoxyethane, cyclopentane, hexane, cyclohexane or heptane.

HFE may, for example, be $CF_3CH_2OCF_2CF_2H$, $C_4F_9OCH_3$, $C_4F_9OC_2H_5$, $CF_3CF_2CF_2OCH_3$ or $(CF_3)_2CFOCH_3$.

HFC may, for example, be $CHF_2CH_2CF_3$, $CF_3CH_2CF_2CH_3$ or $F_3C—C(F)=CH_2$.

The poor solvent (B1) is preferably HFE or HFC, and from the viewpoint of the availability, cost, boiling point, and separation and recovery, $CF_3CH_2OCF_2CF_2H$ is preferred. As the poor solvent (B1), one type may be used alone, or two or more types may be used in combination.

Further, in a case where the solution or dispersion of the fluoropolymer (A) is based on a liquid containing the fluoropolymer (A) obtained by solution polymerization, bulk polymerization, suspension polymerization or emulsion polymerization, an unreacted monomer contained in such a liquid, is to be included in the solvent (B).

Condition (i-2):

If the degree of swelling of the fluoropolymer (A) by the solvent (B) is less than 50%, in the step (i), the fluoropolymer (A) tends to flocculate in a finely dispersed state, whereby it tends to be difficult to form particles of the fluoropolymer (A) having a proper particle size in the step (ii). If the degree of swelling of the fluoropolymer (A) by the solvent (B) exceeds 1,200%, the solvent (C) to flocculate the fluoropolymer (A) in the step (ii) is required in a large amount, and in some cases, flocculation of the fluoropolymer (A) in the step (ii) becomes difficult.

The degree of swelling of the fluoropolymer (A) by the solvent (B) is preferably from 100 to 800%, more preferably from 300 to 800%.

Method for Preparing the Solution or Dispersion of a Fluoropolymer (A)

As the method for preparing the solution or dispersion of a fluoropolymer (A), the following method may, for example, be mentioned.

A method wherein a liquid containing a fluoropolymer (A) is obtained by a solution polymerization method employing a good solvent (B2), and then, such a solution is diluted by using the poor solvent (B1) and/or the good solvent (B2), so that the degree of swelling of the fluoropolymer (A) will be from 50 to 1,200%.

In such a method, the solvent (B) will be a mixture of the good solvent (B2) used for the solution polymerization method, the poor solvent (B1) and/or the good solvent (B2) used for dilution, and an unreacted monomer.

Step (ii)

In the step (ii), the following conditions (ii-1) to (ii-4) are required to be satisfied.

(ii-1) The solvent (C) contains a poor solvent (C1) whereby the degree of swelling of the fluoropolymer (A) is at most 50%.

(ii-2) The degree of swelling of the fluoropolymer (A) by a mixed solvent (BC) of the solvents (B) and (C) is from 0 to 100%.

(ii-3) The ratio ($W_C/W_B$) of the mass (WO of the solvent (C) to the mass ($W_B$) of the solvent (B) is from 1 to 5.

(ii-4) The ratio ($S_{BC}/S_B$) of the degree of swelling ($S_{BC}$) of the fluoropolymer (A) by the mixed solvent (BC) to the degree of swelling ($S_B$) of the fluoropolymer (A) by the solvent (B) is at most 0.5.

Condition (ii-1):

If the solvent (C) does not contain a poor solvent (C1), it becomes difficult to satisfy the after-mentioned condition (ii-2).

In a case where the fluoropolymer (A) is a perfluorocarbon polymer having a sulfonic acid type functional group, the poor solvent (C1) may, for example, be HFE, HFC, methanol, ethanol, 1-propanol, isopropanol, m-butanol, 2-butanol, t-butanol, acetone, acetonitrile, 1,2-dimethoxyethane, cyclopentane, hexane, cyclohexane or heptane.

HFE may, for example, be $CF_3CH_2OCF_2CF_2H$, $C_4F_9OCH_3$, $C_4F_9OC_2H_5$, $CF_3CF_2CF_2OCH_3$ or $(CF_3)_2CFOCH_3$.

HFC may, for example, be $CHF_2CH_2CF_3$, $CF_3CH_2CF_2CH_3$ or $F_3C—C(F)=CH_2$.

As the poor solvent (C1), HFE, HFC or methanol is preferred. From the viewpoint of the availability, cost, boiling point, and separation and recovery, $CF_3CH_2OCF_2CF_2H$ or methanol is more preferred. From such a viewpoint that the effects of the present invention can sufficiently be obtained, $CF_3CH_2OCF_2CF_2H$ is further preferred. As the poor solvent (C1), one type may be used alone, or two or more types may be used in combination.

The solvent (C) may contain a good solvent (C2) whereby the degree of swelling of the fluoropolymer (A) exceeds 50%, within a range to satisfy the after-mentioned condition (ii-2).

In a case where the fluoropolymer (A) is a perfluorocarbon polymer having a sulfonic acid type functional group, the good solvent (C2) may, for example, be $C_4F_9C_2H_5$, $C_6F_{13}CH_2CH_3$, $C_8F_{17}C_2H_5$, $C_6F_{13}H$, $HC_6F_{12}H$, $HC_4F_8H$, $C_6F_{14}$, $C_7F_{16}$, $CF_3CFHCFHCF_2CF_3$ or $(CF_3)_2CFCFHCF-HCF_3$, and from the viewpoint of the availability, $C_6F_{13}H$ is preferred. As the good solvent ($C_{2-}$), one type may be used alone, or two or more types may be used in combination.

Condition (ii-2):

If the degree of swelling of the fluoropolymer (A) by the mixed solvent (BC) exceeds 100%, in the step (ii), flocculation of the fluoropolymer (A) tends to be difficult. The degree of swelling being 0% represents a case where the solvent has no affinity with the fluoropolymer (A), and when it is 0%, particles are more readily formed.

The degree of swelling of the fluoropolymer (A) by the mixed solvent (BC) is preferably from 1 to 90%, more preferably from 1 to 80%.

Condition (ii-3):

If the ratio ($W_C/W_B$) of the mass ($W_C$) of the solvent (C) to the mass ($W_B$) of the solvent (B) is less than 1, the amount of the solvent for flocculation tends to be too small, and the fluoropolymer (A) tends to hardly flocculate in the step (ii). If $W_C W_B$ exceeds 5, the fluoropolymer (A) tends to rapidly flocculate in a short time, whereby fine particles are likely to be formed. Further, if it exceeds 5, the amount of the solvent (C) to be used becomes large, such being not efficient and hardly industrially acceptable as the amount of the solvent to be used for the fluoropolymer (A).

$W_C/W_B$ is preferably from 1 to 3, more preferably from 1 to 2.

Condition (ii-4):

If the ratio ($S_{BC}/S_B$) of the degree of swelling ($S_{BC}$) of the fluoropolymer (A) by the mixed solvent (BC) to the degree of swelling ($S_B$) of the fluoropolymer (A) by the solvent (B) exceeds 0.5, the difference in the degree of swelling of the fluoropolymer (A) as between before and after the addition of the solvent (C) tends to be small, and the fluoropolymer (A) tends to hardly flocculate.

$S_{BC}/S_B$ is preferably at most 0.4, more preferably at most 0.3.

Effects of the Temperature in the Step (ii)

In the step (ii), the temperature of the solution or dispersion of the fluoropolymer (A) immediately before mixing the solution or dispersion of the fluoropolymer (A) with the solvent (C) is preferably adjusted to be within a range of from 35 to 60° C. By raising the temperature, the degree of swelling ($S_B$) of the fluoropolymer (A) by the solvent (B) can be increased. The change by the temperature, of the degree of swelling ($S_B$) is more remarkable than the change by the temperature, of the degree of swelling ($S_{BC}$) of the fluoropolymer (A) by the mixed solvent (BC), whereby the difference in the degree of swelling between the mixed solvent (BC) and the solvent (B) can be made large. That is, by reducing the ratio ($S_{BC}/S_B$) of the degree of swelling ($S_{BC}$) of the fluoropolymer (A) by the mixed solvent (BC) to the degree of swelling ($S_B$) of the fluoropolymer (A) by the solvent (B), formation of particles becomes easy, and $W_C/W_B$ can be made small, whereby the amount of the solvent (C) to be used can be made small. Further, by adjusting the temperature to be at least 35° C., the viscosity of the solution or dispersion of the fluoropolymer (A) can be made low, whereby withdrawal from the reactor can be more facilitated. By adjusting the temperature to be at most 60° C., it is possible to suppress an evaporation loss of the solvent. In a process for homogenizing the solution or dispersion of the fluoropolymer (A), the temperature may be made to at least 60° C. in e.g. a closed container. In order to homogenize it in a short time, the higher the temperature the better. However, as mentioned above, immediately before mixing it with the solvent (C), the temperature is preferably within a range of from 35 to 60° C.

Further, by adjusting the proportions of the poor solvent (B1) and the good solvent (B2), or the proportion of an unreacted monomer, in the solvent (B), $S_{BC}/S_B$ can be changed, and thus the same effect as the effect of adjusting the temperature, can be expected.

Step (iii)

The liquid containing the particles of the fluoropolymer (A) is subjected to filtration to separate and recover the particles of the fluoropolymer (A). Further, as the case requires, an unreacted monomer is recovered from the filtrate.

As such a filtration method, a known filtration method may be employed. The recovered particles of the fluoropolymer (A) may be washed with a poor solvent (C1), as the case requires.

The recovered particles of the fluoropolymer (A) may be dried by a known drying method, as the case requires.

Degree of Swelling

The degree of swelling of the fluoropolymer (A) by each solvent will be an index for the affinity between each solvent and the fluoropolymer (A). In a good solvent, the fluoropolymer (A) is stably present in a state swelled or dissolved by the good solvent. When a poor solvent is added to such a state, the good solvent showing affinity with the fluoropolymer (A) will decrease, and the fluoropolymer (A) which has been in a swelled state, will shrink and gather for flocculation, or the fluoropolymer (A) which has been in a dissolved state will precipitate and gather for flocculation.

In the present invention, by controlling the degree of swelling before and after the flocculation of the fluoropolymer (A), it becomes possible to form particles of the fluoropolymer (A) having little fine particles and being suitable for solid-liquid separation by e.g. filtration.

The degree of swelling of the fluoropolymer (A) by each solvent, is determined by the following procedural steps (I) to (IV).

(I) The same fluoropolymer as the fluoropolymer (A) in the steps (i) and (ii) is formed into a film, and its dry mass ($W_{A1}$) is measured.

(II) In the same solvent or mixed solvent as the poor solvent (B1), the good solvent (B2), the poor solvent (C1), the good solvent (C2), the solvent (B) or the mixed solvent (BC) in the steps (i) and (ii) (hereinafter such a solvent is referred to as a simulated solvent), the film-form fluoropolymer is immersed for 16 hours at the temperature of the solution or dispersion of the fluoropolymer (A) immediately before mixing the solution or dispersion of the fluoropolymer (A) with the solvent (C) in the step (ii).

(III) The film-form fluoropolymer is taken out from the simulated solvent, and the simulated solvent is swiftly wiped off, whereupon the mass ($W_{A2}$) of the film-form fluoropolymer is measured.

(IV) The degree of swelling is obtained from the following formula (1).

$$\text{Degree of swelling}(\%) = (W_{A2} - W_{A1})/W_{A1} \times 100 \qquad (1)$$

The same fluoropolymer as the fluoropolymer (A) means that the types of constituting units derived from monomers, their compositional ratio and the molecular weight are the same. Such a fluoropolymer may be obtained, for example, by sampling a portion of a solution of a fluoropolymer (A) obtained by a solution polymerization method, and recovering the fluoropolymer (A) from such a solution.

The same simulated solvent as the poor solvent (B1), the good solvent (B2), the poor solvent (C1), the solvent (B) or the mixed solvent (BC) means that the type of the solvent and its compositional ratio are the same. The amount of the solvent or mixed solvent wherein the film-form fluoropolymer is immersed, is adjusted to be excessive to the amount of the film-form fluoropolymer.

Fluoropolymer (A)

The fluoropolymer (A) may, for example, be a fluoropolymer having polymerized units based on at least one member selected from the group consisting of a fluoroolefin, a fluorovinyl ether, a fluoromonomer having a polymerizable double bond group, and a fluoromonomer having an alicyclic structure; or a fluorinated ion exchange resin. From such a viewpoint that the effects of the present invention are sufficiently obtainable, a fluorinated ion exchange resin is preferred. As the fluorinated ion exchange resin, a perfluorocarbon polymer having a sulfonic acid type functional group (which may contain an etheric oxygen atom) is preferred. The sulfonic acid type functional group is a sulfonic acid group, its salt or a group which is hydrolyzable to form a sulfonic acid group. The group which is hydrolyzable to form a sulfonic acid group may, for example, be —SO$_2$F, —SO$_2$Cl or —SO$_2$Br.

Such a perfluorocarbon polymer is preferably the following polymer (F).

Polymer (F)

The polymer (F) is a polymer having —SO$_2$F groups, obtained by polymerizing a compound (m1) and/or a compound (m2), and, if necessary, other monomers.

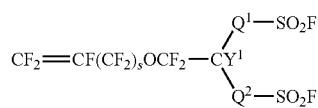
(m1)

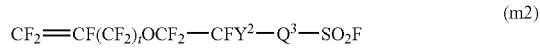
(m2)

wherein Q$^1$ is a perfluoroalkylene group which may have an etheric oxygen atom, Q$^2$ is a single bond or a perfluoroalkylene group which may have an etheric oxygen atom, Y$^1$ is a fluorine atom or a monovalent perfluoroorganic group, and s is 0 or 1, and Q$^3$ is a single bond or a perfluoroalkylene group which may have an etheric oxygen atom, Y$^2$ is a fluorine atom or a monovalent perfluoroorganic group, and t is 0 or 1.

As the compound (m1), a compound (m11) is preferred, and a compound (m11-1), a compound (m11-2) or a compound (m11-3) is more preferred.

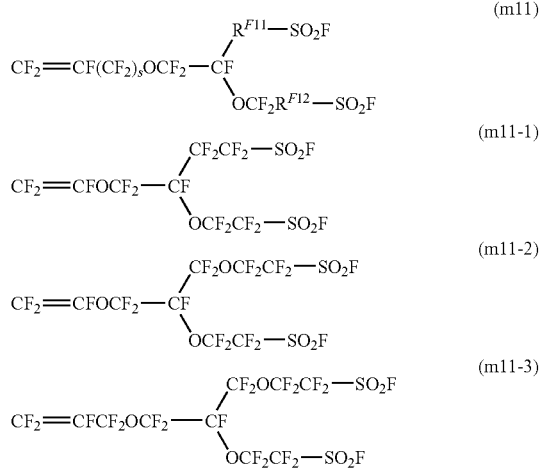

wherein, R$^{F11}$ is a single bond or a C$_{1-6}$ linear perfluoroalkylene group which may have an etheric oxygen atom, and R$^{F12}$ is a C$_{1-6}$ linear perfluoroalkylene group.

The compound (m11) may be produced, for example, by the following synthetic route.

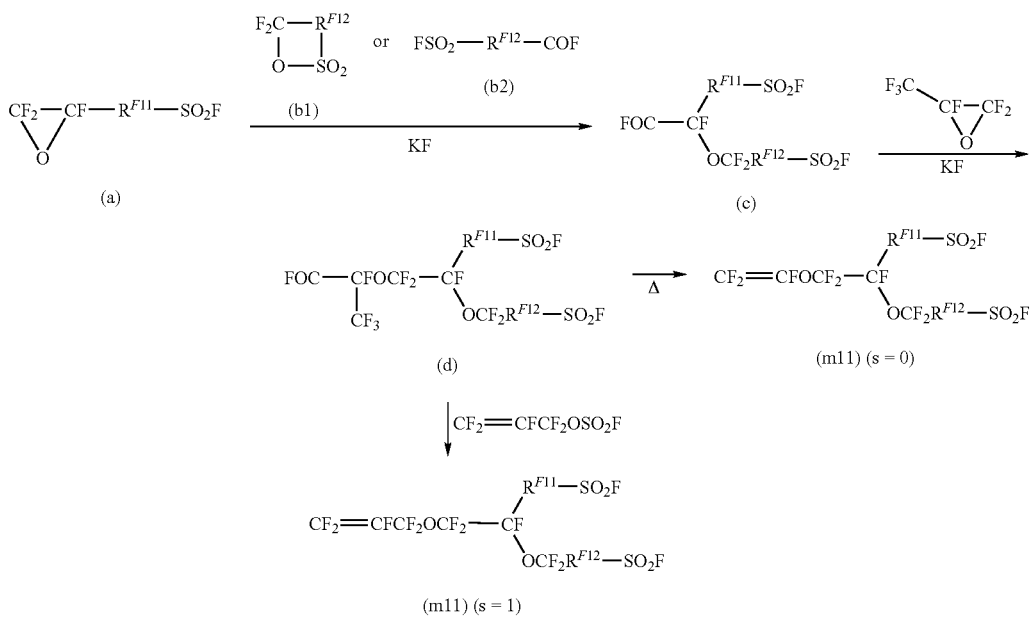

As the compound (m2), a compound (m21) is preferred, and a compound (m21-1), a compound (m21-2), a compound (m21-3) or a compound (m21-4) is more preferred.

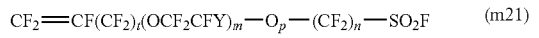

$$CF_2=CF(CF_2)_t(OCF_2CFY)_m-O_p-(CF_2)_n-SO_2F \quad (m21)$$

$$CF_2=CFOCF_2CF-O-CF_2CF_2-SO_2F \quad (m21\text{-}1)$$

$$\underset{CF_3}{|}$$

$$CF_2=CFOCF_2CF_2-SO_2F \quad (m21\text{-}2)$$

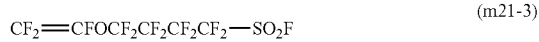

$$CF_2=CFOCF_2CF_2CF_2CF_2-SO_2F \quad (m21\text{-}3)$$

$$CF_2=CFCF_2OCF_2CF_2-SO_2F \quad (m21\text{-}4)$$

wherein Y is a fluorine atom or a trifluoromethyl group, m is an integer of from 0 to 3, n is an integer of from 1 to 12, p is 0 or 1, and m+p>0.

The compound (m21) can be produced, for example, by a known synthetic method, such as a method disclosed by D. J. Vaugham, in "Du Pont (novation", Vol. 43, No. 3, 1973, p. 10 or a method disclosed in Examples in U.S. Pat. No. 4,358,412.

As other monomers, tetrafluoroethylene, chlorotrifluoroethylene, trifluoroethylene, vinylidene fluoride, vinyl fluoride, ethylene, propylene, a perfluoro α-olefin (such as hexafluoropropylene), a (perfluoroalkyl)ethylene (such as (perfluorobutyl)ethylene), a (perfluoroalkyl)propene (such as 3-perfluorooctyl-1-propene), a perfluorovinyl ether (such as a perfluoro(alkyl vinyl ether), a perfluoro(etheric oxygen atom-containing alkyl vinyl ether), etc. may, for example, be mentioned. A perfluoromonomer is preferred, and tetrafluoroethylene (hereinafter referred to as TFE) is more preferred.

As the perfluorovinyl ether, a compound (m3) is preferred, and a compound (m31), a compound (m32) or a compound (m33) is more preferred.

$$CF_2=CF-(OCF_2CFZ)_q-O-R^f \quad (m3)$$

$$CF_2=CF-O-(CF_2)_vCF_3 \quad (m31)$$

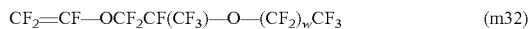

$$CF_2=CF-OCF_2CF(CF_3)-O-(CF_2)_wCF_3 \quad (m32)$$

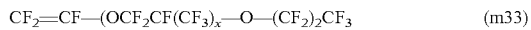

$$CF_2=CF-(OCF_2CF(CF_3))_x-O-(CF_2)_2CF_3 \quad (m33)$$

wherein Z is a fluorine atom or a trifluoromethyl group, $R^f$ is a linear or branched $C_{1\text{-}12}$ perfluoroalkyl group, q is an integer of from 0 to 3, v is an integer of from 1 to 9, w is an integer of from 1 to 9, and x is 2 or 3.

The polymerization method may, for example, be a known polymerization method such as a solution polymerization method, a bulk polymerization method, a suspension polymerization method or a emulsion polymerization method, and a solution polymerization method is preferred.

The polymerization is carried out under a radical-forming condition. The radical-forming method may, for example, be a method of applying a radiation such as an ultraviolet ray, a γ-ray or an electron ray, or a method of adding a radical initiator.

The polymerization temperature is usually from 10 to 150° C. The radical initiator may, for example, be a bis(fluoroacyl) peroxide, a bis(chlorofluoroacyl) peroxide, a dialkylperoxydicarbonate, a diacyl peroxide, a peroxyester, an azo compound, or a persulfate. From such a viewpoint that a polymer F with little unstable terminal groups is obtainable, a perfluorocompound such as a bis(fluoroacyl) peroxide may be used.

As a solvent to be used for the solution polymerization method, the above-described good solvent (B2) is preferred. In the solution polymerization method, the monomer, the radical initiator, etc. are added in the solvent, and radicals are formed in the solvent to carry out polymerization of the monomer. Addition of the monomer may be all at once or gradual, or it may be continuous addition.

After the step (iii), as the case requires, the recovered polymer (F) may be contacted with fluorine gas to fluorinate unstable terminal groups of the polymer (F).

Further, —SO₂F groups in the polymer (F) may be converted to sulfonic acid groups, sulfone imide groups or sulfone methide groups, by a known method.

In the present invention, when the fluoropolymer (A) is a perfluorocarbon polymer having sulfonic acid groups, the ion exchange capacity of the polymer is preferably from 0.5 to 3.0 meq/g dry resin, more preferably from 0.8 to 2.7 meq/g dry resin.

In the above-described process for producing fluoropolymer particles of the present invention, the degree of swelling before flocculation of the fluoropolymer (A) is controlled to satisfy the conditions (i-1) and (i-2), and the degree of swelling after flocculation of the fluoropolymer (A) is controlled to satisfy the conditions (ii-1) to (ii-4), whereby formation of fine particles can sufficiently be suppressed. As a result, separation and recovery of the fluoropolymer particles by filtration or the like, and recovery of an unreacted monomer, will be easy.

EXAMPLES

Now, the present invention will be described in further detail with reference to Examples, but it should be understood that the present invention is by no means restricted by such Examples.

Examples 1 to 4 are Comparative Examples, and Examples 5 to 20 are Working Examples of the present invention.

TQ

TQ (unit: ° C.) is an index for the molecular weight and softening temperature of the polymer (F) and is such a temperature that when melt-extrusion of the polymer (F) is carried out under an extrusion pressure condition of 2.94 (MPa) by using a nozzle having a length of 1 mm and an inner diameter of 1 mm, the amount of extrusion becomes 100 mm³/sec.

By using Flow Tester CFT-500D (manufactured by Shimadzu Corporation), the amount of extrusion of the polymer (F) was measured by changing the temperature, and TQ at which the amount of extrusion becomes 100 mm³/sec. was obtained.

Ion Exchange Capacity

—SO₂F groups of the polymer (F) were hydrolyzed and then converted to sulfonic acid groups by conversion to an acid form thereby to obtain a polymer (H) having sulfonic acid groups.

By using a 0.35 N sodium hydroxide solution, the polymer (H) was neutralized at 60° C. over a period of 40 hours, and a non-reacted sodium hydroxide was titrated with 0.14 N hydrochloric acid to obtain an ion exchange capacity.

Proportion of Particles of at Most 38 μm

In the step (iii), particles of the polymer (F) immediately after the filtration were partly sampled in a non-dried state and put in a sieve of 38 μm. Particles passed through the sieve and particles remained on the sieve were dried at 80° C. for 6 hours, and the proportion of the particles passed through the sieve was measured.

Degree of Swelling (I) The particles of the polymer (F) obtained by drying after the step (iii) were hot-pressed to obtain a film having a thickness of about 100 μm. From such a film, a sample of 20 mm×20 mm was cut out, and the dry mass ($W_{A1}$) was measured.

(II) In about 50 g of the same simulated solvent as the poor solvent (B1) (the following compound (s1-1)), the good solvent (B2) (the following compound (s2-1)), the poor solvent (C1) (the following compound (s1-1) or the following compound (s1-2)), the solvent (B) (a mixture of the good solvent (B2) used for the solution polymerization method, the good solvent (B2) used for dilution, and an unreacted monomer, or a mixture of the good solvent (B2) used for the solution polymerization method, the good solvent (B2) used for dilution, the poor solvent (B1) used for dilution and an unreacted monomer) or the mixed solvent (BC), the above sample was immersed for 16 hours at the temperature of the solution or dispersion of the fluoropolymer (A) immediately before mixing the solution or dispersion of the fluoropolymer (A) with the solvent (C) in the step (ii).

(III) The sample was taken out from the simulated solvent, and the simulated solvent was swiftly wiped off, whereupon the mass ($W_{A2}$) of the sample was measured.

(IV) The degree of swelling was obtained from the following formula (1).

$$\text{Degree of swelling}(\%) = (W_{A2} - W_{A1})/W_{A1} \times 100 \quad (1)$$

Solvents $$C_6F_{13}H(CF_3CF_2CF_2CF_2CF_2CF_2H) \quad (s2\text{-}1)$$

$$CF_3CH_2OCF_2CF_2H \quad (s1\text{-}1)$$

$$CF_3CH_2CF_2CH_3 \quad (s1\text{-}2)$$

Radical Initiator $$CH_3OC(O)C(CH_3)_2-N=N-C(CH_3)_2C(O)OCH_3 \quad (r\text{-}1)$$

Preparation Example 1

Into a stainless steel autoclave having an internal capacity of 230 mL, 49.37 g of the compound (m21-1), 84.03 g of the compound (m11-2), 23.00 g of the compound (s2-1) as a good solvent (B2), and 15.4 mg of the compound (r-1) as a radical initiator were charged and sufficiently deaerated under cooling with liquid nitrogen. Thereafter, the temperature was raised to 66° C., TFE was introduced into the system, and the pressure was maintained at 1.03 MPaG. While maintaining the pressure to be constant at 1.03 MPaG, upon expiration of 6 hours, the autoclave was cooled, and the gas in the system was purged to terminate the reaction thereby to obtain a liquid containing a polymer (F-1). From the measured values of the composition and the yield of the obtained polymer, the solid content concentration and the composition of the liquid phase containing the polymer (F-1) after completion of the reaction were calculated. The results are shown in Table 1.

Preparation Examples 2 and 3

A liquid containing a polymer (F-2) and a liquid containing a polymer (F-3) were obtained in the same manner as in Preparation Example 1 except that the charged amounts and conditions were changed as shown in Table 1. From the measured values of the compositions and the yields of the obtained polymers, the solid content concentration and the compositions of the liquid phases containing polymer (F-2) and (F-3) after completion of the reaction were calculated. The results are shown in Table Example 1

Step (i)

The liquid containing the polymer (F-1) obtained in Preparation Example 1 was diluted with 225 g of the compound (s2-1) as a good solvent (B2) to obtain a dispersion of the polymer (F-1). The preparation of the dispersion was carried out in a temperature-controlled warm water tank under heating so that the temperature became 25° C. The composition of the solvent (B) as the dispersing medium for the dispersion and the solid content concentration are shown in Table 2.

Step (ii)

The dispersion of the polymer (F-1) was added to 371 g of the compound (s1-1) as a poor solvent (C1) to flocculate the polymer (F-1) thereby to form particles of the polymer (F-1). At the time of forming the particles, flocculation was carried out in a stirring tank with a jacket so that the temperature became 25° C. $W_C/W_B$ and the temperature of the solution or dispersion of the fluoropolymer (A) immediately before mixing the solution or dispersion of the fluoropolymer (A) with the solvent (C) are shown in Table 3.

Step (iii)

The liquid containing the particles of the polymer (F-1) was subjected to filtration, and a portion thereof was sampled immediately before completion of the filtration, whereupon the proportion of the particles of at most 38 μm was measured. The results are shown in Table 3.

The separated and recovered particles of the polymer (F-1) were added to the compound (s1-1) as a poor solvent (C1), followed by stirring and then by filtration. The recovered particles of the polymer (F-1) were dried under reduced pressure overnight at 80° C. The polymer yield was 19.5 g as the sum including the sampled one.

With respect to the particles of the polymer (F-1), TQ, the ion exchange capacity and the degrees of swelling by the respective simulated solvents were measured. The results are shown in Tables 1 and 3.

Examples 2 to 20

Particles of polymers (F-1) to (F-3) were obtained in the same manner as in Example 1 except that the type of the polymer (F), the composition of the solvent (B), the type and amount of the solvent (C), and the temperature of the solution or dispersion of the fluoropolymer (A) immediately before mixing the solution or dispersion of the fluoropolymer (A) with the solvent (C) in the step (ii), were changed as shown in Tables 2 and 3. The results are shown in Tables 1 to 3.

TABLE 1

| | | | (F-1) | (F-2) | (F-3) |
|---|---|---|---|---|---|
| Polymerization | Charge | (m11-2) [g] | 84.03 | — | 84.04 |
| | | (m21-1) [g] | 49.37 | 69.00 | 49.36 |
| | | (s2-1) [g] | 23.00 | 98.30 | 15.67 |
| | | (r-1) [mg] | 15.4 | 33.5 | 22.5 |
| | Conditions | Temp. [° C.] | 66 | 70 | 66 |
| | | Pressure [MPaG] | 1.03 | 0.79 | 1.13 |
| | | Time [h] | 6 | 6.2 | 4.5 |
| | Supplied amount | TFE [g] | 10.51 | 21.12 | 11.05 |
| | Condition | Time [h] | 6 | 6.2 | 4.5 |

TABLE 1-continued

|  |  |  | (F-1) | (F-2) | (F-3) |
|---|---|---|---|---|---|
| After polymerization | Solid phase | Polymer yield [g] | 19.50 | 27.89 | 20.70 |
|  |  | Solid content concentration [mass %] | 11.79 | 15.26 | 13.05 |
|  | Liquid phase | (m11-2) [g] | 77.40 | — | 77.00 |
|  |  | (m21-1) [g] | 47.01 | 62.23 | 46.75 |
|  |  | (s2-1) [g] | 23.00 | 98.30 | 15.67 |
| Physical properties of polymer | TQ [° C.] |  | 230 | 235 | 247 |
|  | Ion exchange capacity [meq/g dry resin] |  | 1.53 | 0.99 | 1.50 |
|  | Degree of swelling (25° C.) | (m11-2) [%] | 450 | 100 | 300 |
|  |  | (m21-1) [%] | 670 | 120 | 450 |
|  |  | (s2-1) [%] | 1,150 | 110 | 500 |
|  |  | (s1-1) [%] | 36 | 12 | 30 |
|  |  | (s1-2) [%] | — | — | 18 |

TABLE 2

Dispersion of polymer (F)

| | | Solvent (B) | | | Unreacted monomer | | Degree of swelling $S_B$ [%] | Solid content concentration [mass %] |
|---|---|---|---|---|---|---|---|---|
| | | For polymerization (B2) | For dilution (B2) | For dilution (B1) | | | | |
| Step (i) | Polymer Type | (s2-1) [g] | (s2-1) [g] | (s1-1) [g] | (m11-2) [g] | (m21-1) [g] | | |
| Ex. 1 | (F-1) | 23.00 | 225 | — | 77.40 | 47.01 | 1,300 | 5 |
| Ex. 2 | (F-2) | 98.30 | 186 | 190 | — | 62.23 | 40 | 5 |
| Ex. 3 | (F-3) | 15.67 | 147 | 108 | 77.00 | 46.75 | 340 | 5 |
| Ex. 4 | (F-2) | 98.30 | 375 | — | — | 62.23 | 115 | 5 |
| Ex. 5 | (F-3) | 15.67 | 137 | — | 77.00 | 46.75 | 1,100 | 7 |
| Ex. 6 | (F-2) | 98.30 | 375 | — | — | 62.23 | 115 | 5 |
| Ex. 7 | (F-3) | 15.67 | 174 | 81 | 77.00 | 46.75 | 380 | 5 |
| Ex. 8 | (F-3) | 15.67 | 201 | 54 | 77.00 | 46.75 | 490 | 5 |
| Ex. 9 | (F-3) | 15.67 | 201 | 54 | 77.00 | 46.75 | 490 | 5 |
| Ex. 10 | (F-3) | 15.67 | 201 | 54 | 77.00 | 46.75 | 490 | 5 |
| Ex. 11 | (F-3) | 15.67 | 137 | — | 77.00 | 46.75 | 1,100 | 7 |
| Ex. 12 | (F-3) | 15.67 | 242 | 14 | 77.00 | 46.75 | 900 | 5 |
| Ex. 13 | (F-2) | 98.30 | 304 | 71 | — | 62.23 | 90 | 5 |
| Ex. 14 | (F-3) | 15.67 | 228 | 27 | 77.00 | 46.75 | 725 | 5 |
| Ex. 15 | (F-3) | 15.67 | 147 | 108 | 77.00 | 46.75 | 340 | 5 |
| Ex. 16 | (F-2) | 98.30 | 95 | — | — | 62.23 | 120 | 10 |
| Ex. 17 | (F-2) | 98.30 | 70 | — | — | 62.23 | 180 | 11 |
| Ex. 18 | (F-2) | 98.30 | 95 | — | — | 62.23 | 300 | 10 |
| Ex. 19 | (F-3) | 15.67 | 147 | 108 | 77.00 | 46.75 | 590 | 5 |
| Ex. 20 | (F-3) | 15.67 | 201 | 54 | 77.00 | 46.75 | 770 | 5 |

TABLE 3

| | | Solvent (C) | | Mixed solvent (BC) | | | Temperature of the solution or dispersion of polymer immediately before mixing [° C.] | Proportion of particles of at most 38 μm [mass %] |
|---|---|---|---|---|---|---|---|---|
| | | For flocculation (C1) | | Degree of swelling | | | | |
| Step (ii) | Polymer Type | (s1-1) [g] | (s1-2) [g] | $S_{BC}$ [%] | $W_C/W_B$ | $S_{BC}/S_B$ | | |
| Ex. 1 | (F-1) | 371 | — | 135 | 1 | 0.10 | 25 | 20 |
| Ex. 2 | (F-2) | 530 | — | 20 | 1 | 0.50 | 25 | 54 |
| Ex. 3 | (F-3) | 393 | — | 110 | 1 | 0.32 | 25 | 6 |
| Ex. 4 | (F-2) | 477 | — | 35 | 0.9 | 0.30 | 25 | 18 |
| Ex. 5 | (F-3) | 1,374 | — | 65 | 5 | 0.06 | 25 | 3 |
| Ex. 6 | (F-2) | 1,325 | — | 25 | 2.5 | 0.22 | 25 | 1 |
| Ex. 7 | (F-3) | 590 | — | 90 | 1.5 | 0.24 | 25 | 0.3 |
| Ex. 8 | (F-3) | 549 | — | 60 | 2 | 0.12 | 25 | 0.2 |
| Ex. 9 | (F-3) | 472 | — | 80 | 1.2 | 0.17 | 25 | 1 |
| Ex. 10 | (F-3) | 795 | — | 50 | 2.9 | 0.10 | 25 | 0.1 |
| Ex. 11 | (F-3) | — | 412 | 85 | 1.5 | 0.08 | 25 | 5 |
| Ex. 12 | (F-3) | 787 | — | 90 | 2 | 0.10 | 25 | 3 |
| Ex. 13 | (F-2) | 1,060 | — | 25 | 2 | 0.28 | 25 | 5 |
| Ex. 14 | (F-3) | 589 | — | 75 | 1.5 | 0.10 | 25 | 0.3 |
| Ex. 15 | (F-3) | 511 | — | 80 | 1.3 | 0.24 | 25 | 1 |
| Ex. 16 | (F-2) | 500 | — | 25 | 2 | 0.21 | 25 | 1 |
| Ex. 17 | (F-2) | 337 | — | 25 | 1.5 | 0.14 | 40 | 0.2 |
| Ex. 18 | (F-2) | 300 | — | 25 | 1.2 | 0.08 | 50 | 0.4 |

TABLE 3-continued

| | | Solvent (C) For flocculation (C1) | | Mixed solvent (BC) Degree of swelling | | | Temperature of the solution or dispersion of polymer immediately | Proportion of particles of at |
|---|---|---|---|---|---|---|---|---|
| Step (ii) | Polymer Type | (s1-1) [g] | (s1-2) [g] | $S_{BC}$ [%] | $W_C/W_B$ | $S_{BC}/S_B$ | before mixing [° C.] | most 38 μm [mass %] |
| Ex. 19 | (F-3) | 433 | — | 100 | 1.1 | 0.17 | 40 | 0.1 |
| Ex. 20 | (F-3) | 511 | — | 80 | 1.3 | 0.10 | 40 | 0.2 |

INDUSTRIAL APPLICABILITY

The fluoropolymer particles obtained by the process of the present invention are useful for known applications of fluoropolymers. Particularly, particles of the polymer (F) are useful as a material for diaphragms (for alkali electrolysis, electrodialysis, various organic electrolytic syntheses, etc.), polymer electrolyte membranes (for fuel cells, ozone-forming electrolysis, water electrolysis, etc.), polymer catalysts (for organic syntheses, polymerization, etc.) and other membrane materials (for dehumidifiers, humidifying devices, etc.).

The entire disclosure of Japanese Patent Application No. 2008-325358 filed on Dec. 22, 2008 including specification, claims and summary are incorporated herein by reference in its entirety.

What is claimed is:

1. A process for producing fluoropolymer particles, comprising:

preparing a solution or dispersion comprising a fluoropolymer dissolved or dispersed in a first solvent comprising a solvent which causes the fluoropolymer to swell in a degree of exceeding 50% such that the degree of swelling of the fluoropolymer by the first solvent is in a range of from 50 to 1,200% in the solution or dispersion; and mixing the solution or dispersion with a second solvent comprising a solvent which causes the fluoropolymer to swell in a degree of at most 50% such that the fluoropolymer is flocculated and forms fluoropolymer particles and the degree of swelling of the fluoropolymer by a mixture of the first solvent and second solvent is from 0 to 100% in the solution or dispersion, wherein the first solvent and second solvent satisfy $W_C/W_B$ in a range of from 1 to 5 where $W_B$ represents a mass of the first solvent, $W_C$ represents a mass of the second solvent, $W_C/W_B$ is a ratio of the mass of the second solvent to the mass of the first solvent, and the first solvent and second solvent satisfy $S_{BC}/S_B$ of at most 0.5 where $S_{BC}$ represents the degree of swelling of the fluoropolymer by the mixture of the first solvent and second solvent, $S_B$ represents the degree of swelling of the fluoropolymer by the first solvent, and $S_{BC}/S_B$ represents a ratio of the degree of swelling by the mixture of the first solvent and second solvent to the degree of swelling by the first solvent.

2. The process for producing fluoropolymer particles according to claim 1, wherein the first solvent further comprises a solvent which causes the fluoropolymer to swell in a degree of at most 50%.

3. The process for producing fluoropolymer particles according to claim 2, wherein the solvent which causes the fluoropolymer to swell in the degree of at most 50% in the first solvent is at least one member selected from a hydrofluoroether and a hydrofluorocarbon.

4. The process for producing fluoropolymer particles according to claim 2, wherein the solvent which causes the fluoropolymer to swell in the degree of at most 50% is $CF_3CH_2OCF_2CF_2H$.

5. The process for producing fluoropolymer particles according to claim 1, wherein the degree of swelling of the fluoropolymer by the first solvent is in a range of from 100 to 800%.

6. The process for producing fluoropolymer particles according to claim 1, wherein the degree of swelling of the fluoropolymer by the mixture of the first solvent and second solvent is in a range of from 0 to 90%.

7. The process for producing fluoropolymer particles according to claim 1, wherein the solvent which causes the fluoropolymer to swell in a degree of exceeding 50% is a hydrofluorocarbon.

8. The process for producing fluoropolymer particles according to claim 1, wherein the solvent which causes the fluoropolymer to swell in a degree of exceeding 50% is $C_6F_{13}H$.

9. The process for producing fluoropolymer particles according to claim 1, wherein the solvent which causes the fluoropolymer to swell in a degree of at most 50% is at least one member selected from the group consisting of a hydrofluoroether, a hydrofluorocarbon and methanol.

10. The process for producing fluoropolymer particles according to claim 1, wherein the solvent which causes the fluoropolymer to swell in a degree of at most 50% is $CF_3CH_2OCF_2CF_2H$.

11. The process for producing fluoropolymer particles according to claim 1, wherein the fluoropolymer is a perfluorocarbon polymer having a sulfonic acid functional group.

12. The process for producing fluoropolymer particles according to claim 1, further comprising adjusting a temperature of the solution or dispersion of the fluoropolymer immediately before mixing the solution or dispersion of the fluoropolymer with the second solvent within a range of from 35 to 60° C.

13. The process for producing fluoropolymer particles according to claim 1, wherein the fluoropolymer particles have a proportion of particles of at most 38 μm which is at most 5 mass %.

14. The process for producing fluoropolymer particles according to claim 1, wherein the degree of swelling of the fluoropolymer by the mixture of the first solvent and second solvent is from 1 to 90% in the solution or dispersion.

15. The process for producing fluoropolymer particles according to claim 1, wherein the degree of swelling of the fluoropolymer by the mixture of the first solvent and second solvent is from 1 to 80% in the solution or dispersion.

16. The process for producing fluoropolymer particles according to claim 1, wherein the first solvent and second solvent satisfy $W_C/W_B$ in a range of from 1 to 2.

17. The process for producing fluoropolymer particles according to claim 1, wherein the first solvent and second solvent satisfy $S_{BC}/S_B$ of at most 0.3.

* * * * *